Figure 1:
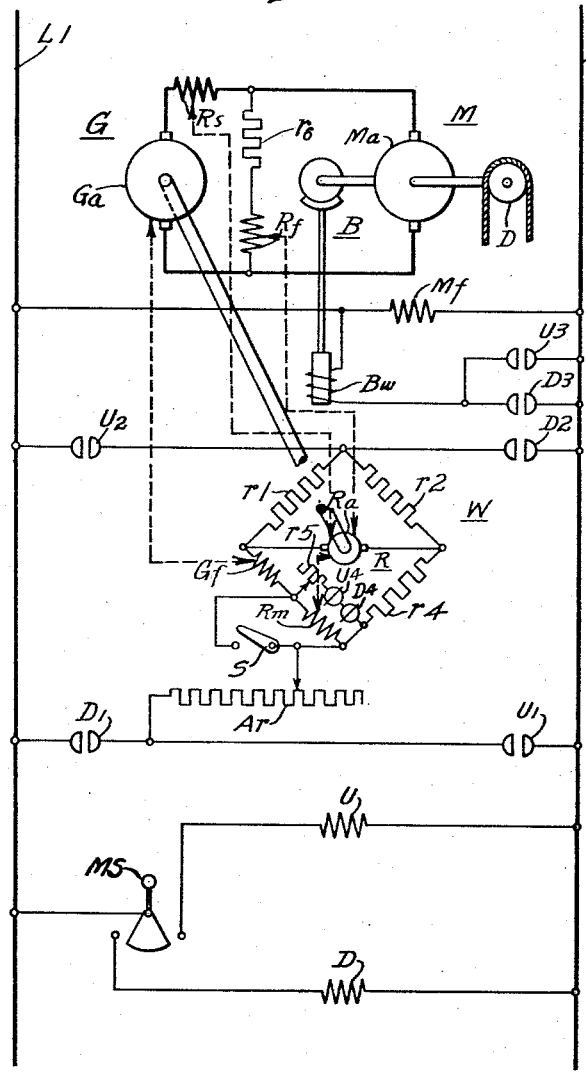

Dec. 13, 1938.       W. F. EAMES       2,140,353
GENERATOR DEMAGNETIZING CONNECTION

Filed Aug. 29, 1936

WITNESSES:

INVENTOR
William F. Eames.
BY
ATTORNEY

Patented Dec. 13, 1938

2,140,353

UNITED STATES PATENT OFFICE 2,140,353

GENERATOR DEMAGNETIZING CONNECTION

William F. Eames, Edgewood, Pa., assignor to Westinghouse Electric Elevator Company, Chicago, Ill., a corporation of Illinois Application August 29, 1936, Serial No. 98,467

6 Claims. (Cl. 172—239)

My invention relates to direct-current motor control apparatus and particularly to variable voltage motor control systems of the type provided with a small regulating generator, or equivalent dynamo-electric machine, connected to control the excitation of the main generator or motor to thereby modify the speed-torque characteristic, or other operating characteristic of the system. Although the invention is of general utility in connection with such apparatus, it is particularly applicable to variable-voltage motor control systems of the type disclosed in U. S. Patent No. 2,094,377, issued upon the copending application of D. Santini and K. M. White, Serial No. 38,770, filed August 31, 1935, and assigned to Westinghouse Electric & Manufacturing Company.

In the aforesaid copending application of Santini and White there is disclosed a variable-voltage motor control system in which the separate excitation winding of the main generator is supplied, by means of a Wheatstone bridge circuit, jointly from a constant-voltage source of direct current and from a small regulating generator. The regulating generator is excited in accordance with motor load, motor terminal voltage and the adjustment of the controller, in a manner to be hereinafter explained, so as to maintain the motor speed at a value corresponding to the controller adjustment.

It has been found in practice that the speed regulation of the main motor in such a control system is extremely accurate, and that the effects of various disturbing factors, such as variations of armature circuit resistance with machine temperature, variations of brush position with temperature, and voltage irregularities caused by residual magnetism, are substantially eliminated. In such a system it is possible to dispense with the generator cumulative series field winding and to depend entirely upon the regulating generator for the compounding effect necessary for flat motor speed-regulation. In order to produce rapid and complete demagnetization of the generator in bringing the motor to rest, however, it has heretofore been regarded as necessary to provide a demagnetizing winding on the main generator, to be connected in well known manner across the generator armature at the zero speed position of the controller.

It is an object of my invention to provide a novel variable-voltage motor control system which will retain the operating advantages of the Santini-White system, mentioned above, but which will produce satisfactory demagnetization of the generator without the use of a demagnetizing winding on the generator.

Another object of my invention is to provide a novel variable-voltage motor control system of the type provided with a small regulating dynamo-electric machine, which will permit demagnetization of the main generator by means of the regulating machine, without the use of a demagnetizing winding on the main generator.

Figure 2:
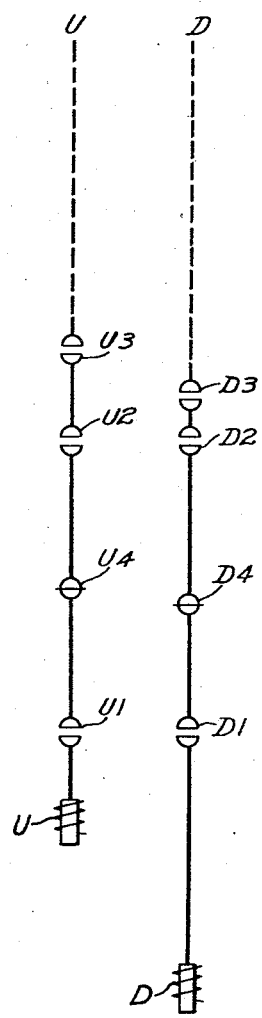

Other objects of my invention will become evident from the following detailed description taken in conjunction with the accompanying drawing, in which:

Figure 1 is a diagrammatic view showing the electrical connections, in simplified form, of a motor control system embodying my invention, and Fig. 2 is a diagrammatic view showing the mechanical connections of coils and contacts of the relays shown in Fig. 1.

Referring to the drawing, the variable-voltage motor control system comprises a direct-current main motor M and a direct-current main generator G having their armatures $Ma$ and $Ga$, respectively, connected in a local circuit. The generator G is provided with a generator field winding $Gf$ (shown near the center of Fig. 1) arranged to be connected for separate excitation to a constant-voltage direct current supply circuit L1, L2 by means of a set of Wheatstone bridge resistors $r_1$, $r_2$ and $r_4$. The motor M is provided with a shunt-type field winding $Mf$ connected for separate excitation to the supply conductors L1 and L2.

The generator G is driven at substantially constant speed by any suitable means, such as an induction motor (not shown), so that its terminal voltage will be dependent upon its field current.

The motor M is mechanically connected to the load, which in the present case is assumed to be an elevator car. As shown, the motor M is mounted on a common shaft with an elevator driving sheave or drum D, and with a spring applied, magnetically-released brake B, all of well known type.

The connection of the generator field winding $Gf$ and the Wheatstone bridge resistors $r_1$, $r_2$ and $r_4$ is such that the generator field winding $Gf$ is connected in one leg of a Wheatstone bridge circuit denoted generally at W; this circuit having one pair of opposite junctions connected to the supply conductors L1 and L2, to be energized at constant voltage. In order to render the constant voltage applied to the bridge circuit variable or adjustable, as is necessary for variable speed operation of the motor M, an adjustable resistor Ar, external to the bridge circuit W, is provided. It will be understood that in a practical application of the invention, the apparatus for varying the speed of the motor M would be of considerably more complicated type, and that the apparatus shown is merely that required to illustrate the novel features of the invention in simplified form.

A small regulating dynamo-electric machine R, preferably driven at substantially constant speed as a generator, is provided for compounding the main generator G. The regulating generator R comprises an armature Ra, connected to opposite junctions of the Wheatstone bridge circuit, a series-type field winding Rs connected in the local circuit of the armatures of the main generator G and motor M, a main field Rm winding connected in series with the generator field winding Gf, and a differential field winding Rf connected across the terminals of the main motor M.

The resistance relationship in the bridge circuit W is such that the ratio of the resistance of the resistor r1 to that of the resistor r2 is equal to the ratio of the sum of the resistances of field windings Rm and Gf to that of the resistor r4. With such a relationship of resistance, any voltage generated by the armature Ra of the regulating generator R causes current to circulate in two parallel paths around the bridge circuit W, but does not cause the flow of current in either direction in the resistor Ar or other elements external to the bridge circuit W. Similarly a voltage impressed on the upper and lower junctions of the bridge circuit W from the supply conductors L1 and L2, produces current flow in two parallel paths through the bridge circuit W, but does not cause any current flow in the armature Ra.

Inasmuch as any voltage developed by the armature Ra of the regulating generator R produces current flow in the generator field winding Gf, the three field windings Rs, Rm, and Rf, individually produce voltage changes of the generator G. The polarity of field and armature connections is such that the exciting magnetomotive force in the regulator R produced by the main field winding Rm acts to increase the voltage of the main generator G; the differential field winding Rf acts to reduce the voltage of the main generator G; and the series type winding Rs acts to increase the voltage of the main generator G when the direction of power flow is from the generator G to the motor M and to reduce the voltage of the main generator G when the direction of power flow is from the motor to the generator.

The main field winding Rm and the differential winding Rf are each designed to produce a regulator armature voltage of the order of 5 or 6 times the maximum operating voltage of the regulating generator R, when their associated circuits are subject to the full voltage derived from the source L1, L2 or the motor M, respectively. However, because of the differential action of these field windings, neither can normally exert more than a small proportion of its total possible effect.

A resistor r6 is included in series with the differential field winding Rf for limiting the effect of temperature changes of the regulating generator Rf upon the excitation effect of the differential winding Rf.

The series field winding Rs is designed to compound the main generator G a sufficient amount to maintain approximately flat speed regulation of the main motor M. This result is accomplished when the component of voltage of the main generator G produced by the excitation of the series type winding Rs is equal to to the armature resistance drop in the motor M plus the IR drop in the armature circuit leads from the points of connection of the differential field winding Rf to the armature terminals of the motor M, multiplied by the factor of 5 or 6 used in the design of windings Rm and Rf. With such a design of windings of the regulating generator R, the main field winding Rm may be considered as a first excitation means for producing a first component of excitation or exciting magnetomotive force of the regulating generator R, and the differential field winding Rf and series type winding Rs may together be considered as a second excitation means for producing a second component of excitation. The first component of excitation is dependent upon the adjustment of the controlling resistor Ar, and the second component is proportional to the counter-electromotive force and consequently the speed of the motor M.

An up direction switch U and a down direction switch D are provided for controlling the direction of rotation of the motor M. For this purpose, the direction switches U and D are provided with the usual direction contacts U1, U2, and D1, D2, respectively, connected to reverse the polarity of current supplied to the generator field winding Gf. The direction switches U and D are also provided with brake contacts U3 and D3 connected to complete a circuit for the release coil Bw of the brake B.

In accordance with my invention, I provide apparatus for establishing a shunt circuit around the main field winding Rm to thereby reduce or eliminate the exciting effect of the latter winding when it is desired to bring the motor M to rest. In the circuit shown, back contacts U4 and D4 are provided on the direction switches U and D, respectively, and are arranged to connect an adjustable resistor r5 in parallel to the main field winding Rm, when both direction switches U and D are open. Apparatus is also provided for reducing or eliminating the effect of the main field winding Rm when the direction switches U and D are in such positions as to normally effect energization of the generator field winding Gf. In the circuit shown, this apparatus is indicated in simplified form as a manual switch S. It will be understood, however, that the effectiveness of the field winding Rm may be reduced or eliminated in various other ways in accordance with the principle of my invention.

A manually operated master switch MS, mounted on the elevator car in well known manner, is provided for controlling the direction switches U and D. The master switch Ms, direction switches U and D and adjustable controlling resistor together constitute control apparatus for controlling the direction and speed of rotation of the motor. It will be obvious, of course, that various more complicated forms of such control apparatus may be used for the same purpose, in accordance with the practice in the art.

The operation of the above-described apparatus may be set forth as follows: In order to produce upward movement of the elevator car, the master switch MS is rotated in counter-clockwise direction, thereby completing an energizing circuit for the up-direction switch U. Upon energization of the up-direction switch U, the latter closes to complete a circuit for the generator field winding Gf through its contacts U1 and U2; to complete a circuit for the release coil Bw of brake B through its contacts U3; and to open the shunt circuit around the main field winding Rm by means of its contacts U4.

Energization of the release coil Bw of the brake B releases the latter against the biasing action of its brake spring (not shown) in well known manner.

As the terminal voltage of motor M is initially zero, the differential field winding Rf has no immediate effect, and the current in the field winding Gf builds up rapidly in response to the voltage supplied to the bridge circuit W from the supply conductors L1 and L2. At the same time, the current flow through the main field winding Rm of the regulator R excites the latter, augmenting the current flow through the generator field winding Gf.

The terminal voltage of generator G accordingly rises rapidly, and the motor M accelerates. At the same time, the differential winding Rf acts to reduce the excitation and voltage of the regulator R. A condition of equilibrium is soon reached in which the motor M operates at the speed corresponding to the adjustment of resistor Ar, and the magnetomotive forces of the field windings Rm and Rf exactly balance out. The regulator R, however, because of the series-type winding Rs, produces a compounding voltage which acts to correct the speed regulation of the motor M. Any deviation of the speed of motor M from the value corresponding to the adjustment of resistor Ar, results in an unbalance of the magnetomotive forces of field windings Rf and Rm, and a regulator voltage is produced tending to correct the speed variation.

In order to stop the motor M, the master switch MS may be centered, or the switch S closed. Assuming the master switch MS is centered, the up-direction switch U drops out, disconnecting the bridge circuit W from the line conductors L1 and L2; interrupting the circuit of the brake release winding Bw; and reestablishing the shunt circuit around the main field winding Rm.

The interruption of the circuit of brake winding Bw causes the application of the brake B, under action of its spring.

The disconnection of the bridge circuit W from the supply conductors L1 and L2 does not interrupt the current flow through the generator field winding Gf, as the regulator R is still free to circulate current through the latter winding. The short-circuiting of the regulator main field winding Rm, however, unbalances the equilibrium in the regulator magnetic circuit, and a large voltage tending to demagnetize the main generator G is developed by the regulator R.

With the main field winding Rm short-circuited, the windings Rs and Rf together produce a magnetomotive force substantially proportional to the counter-electromotive force or speed of motor M, acting in a direction to reduce the motor speed. As the speed of motor M falls, the voltage of regulator R falls until a condition of equilibrium is reached when the motor M is at rest.

By adjusting the resistor rs, the demagnetizing effect of the circuit may be varied to provide the most satisfactory slow-down and stop characteristics for a given installation.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a direct-current motor control system, a generator having a generator armature and a generator field winding, a motor having an armature connected in a local circuit with said generator armature, an auxiliary dynamo-electric machine having an armature connected to said generator field winding and having a first field winding effective to produce an exciting magnetomotive force acting to increase the current in said generator field winding and a second excitation means effective to produce an exciting magnetomotive force acting to decrease the current in said generator field winding; and means for establishing demagnetizing connections for said generator such that said first field winding is short-circuited and said second excitation means is connected for energization substantially in proportion to the speed of said motor.

2. In a direct-current motor control system, a generator having a generator armature and a generator field winding; a motor having an armature connected in a local circuit with said generator armature; an auxiliary dynamo-electric machine having an armature connected to said field winding, a first field winding effective to produce an exciting magnetomotive force acting to increase the voltage of said generator, and a second excitation means effective to produce an exciting magnetomotive force acting to decrease the voltage of said generator; means for causing said motor to operate at a predetermined speed comprising means for energizing said first field winding substantially in proportion to said predetermined speed and for energizing said second excitation means substantially in proportion to the actual speed of said motor; and means for stopping said motor comprising means for short-circuiting said first field winding and for permitting said second excitation means to remain energized to thereby effect demagnetization of said generator.

3. In a direct-current motor control system, a generator having a generator armature and a generator field winding; a motor having an armature connected in a local circuit with said generator armature; an auxiliary dynamo-electric machine having an armature connected to said generator field winding, a first field winding effective to produce an exciting magnetomotive force acting to increase the voltage of said generator, and a demagnetizing winding effective to produce an exciting magnetomotive force acting to decrease the voltage of said generator; means for causing operation of said motor comprising means for energizing said first field winding to a predetermined degree and for energizing said demagnetizing winding substantially in proportion to the voltage of said generator; and means for stopping said motor comprising means for short-circuiting said first field winding and for permitting said demagnetizing winding to remain energized to thereby effect demagnetization of said generator.

4. In a direct-current motor control system, a generator having a generator armature and a generator field winding; a motor having an armature connected in a local circuit with said generator armature; an auxiliary dynamo-electric machine having an armature connected to said generator field winding, a main field winding effective to produce an exciting magnetomotive force acting to increase the voltage of said generator, and a demagnetizing winding effective to produce an exciting magnetomotive force acting to decrease the voltage of said generator; a source of continuous voltage; means for causing operation of said motor comprising a first circuit connecting said generator field winding and said main field winding in series to said source and a second circuit connecting said demagnetizing winding across said local circuit; and decelerating means for said motor comprising means for establishing a shunt path around said main field winding, to thereby reduce the effect of said main field winding and permit said generator field winding and demagnetizing winding to reduce the magnetization of said generator.

5. In a direct-current motor control system, a generator having a generator armature and a generator field winding; a motor having an armature connected in a local circuit with said generator armature; an auxiliary dynamo-electric machine having an armature, a main field winding and a demagnetizing winding; a source of continuous voltage; a set of Wheatstone bridge resistors; means for establishing running connections for said motor such that said Wheatstone bridge resistors are connected to form a bridge circuit having said generator field winding included in one leg thereof and having a first pair of opposite junctions connected to said source and the remaining pair of opposite junctions connected to said armature of said auxiliary dynamo-electric machine, said running connections being such that said main field winding is energized and said demagnetizing winding is connected across said local circuit; and means for establishing decelerating connections for said motor such that said bridge resistors are connected to form said bridge circuit, said demagnetizing winding is connected across said local circuit, and the relative effect of said demagnetizing winding as compared to said main field winding is greatly increased over the corresponding relative effect when said running connections are established.

6. In a direct-current motor control system, a generator having a generator armature and a generator field winding; a motor having an armature connected in a local circuit with said generator armature; an auxiliary dynamo-electric machine having an armature, a main field winding and a demagnetizing winding; a source of continuous voltage; a set of Wheatstone bridge resistors; means for establishing running connections for said motor such that said Wheatstone bridge resistors are connected to form a bridge circuit having said generator field winding and said main field winding serially connected in one leg thereof, said running connections being such that said demagnetizing winding is connected across said local circuit; and means for establishing decelerating connections for said motor by modifying said running connections by establishing a shunt path in parallel to said main field winding.

WILLIAM F. EAMES.